Nov. 9, 1926.  
J. A. DODD  
1,605,924  
MACHINE FOR TRIMMING METAL SHELLS  
Filed August 11, 1925   3 Sheets-Sheet 1
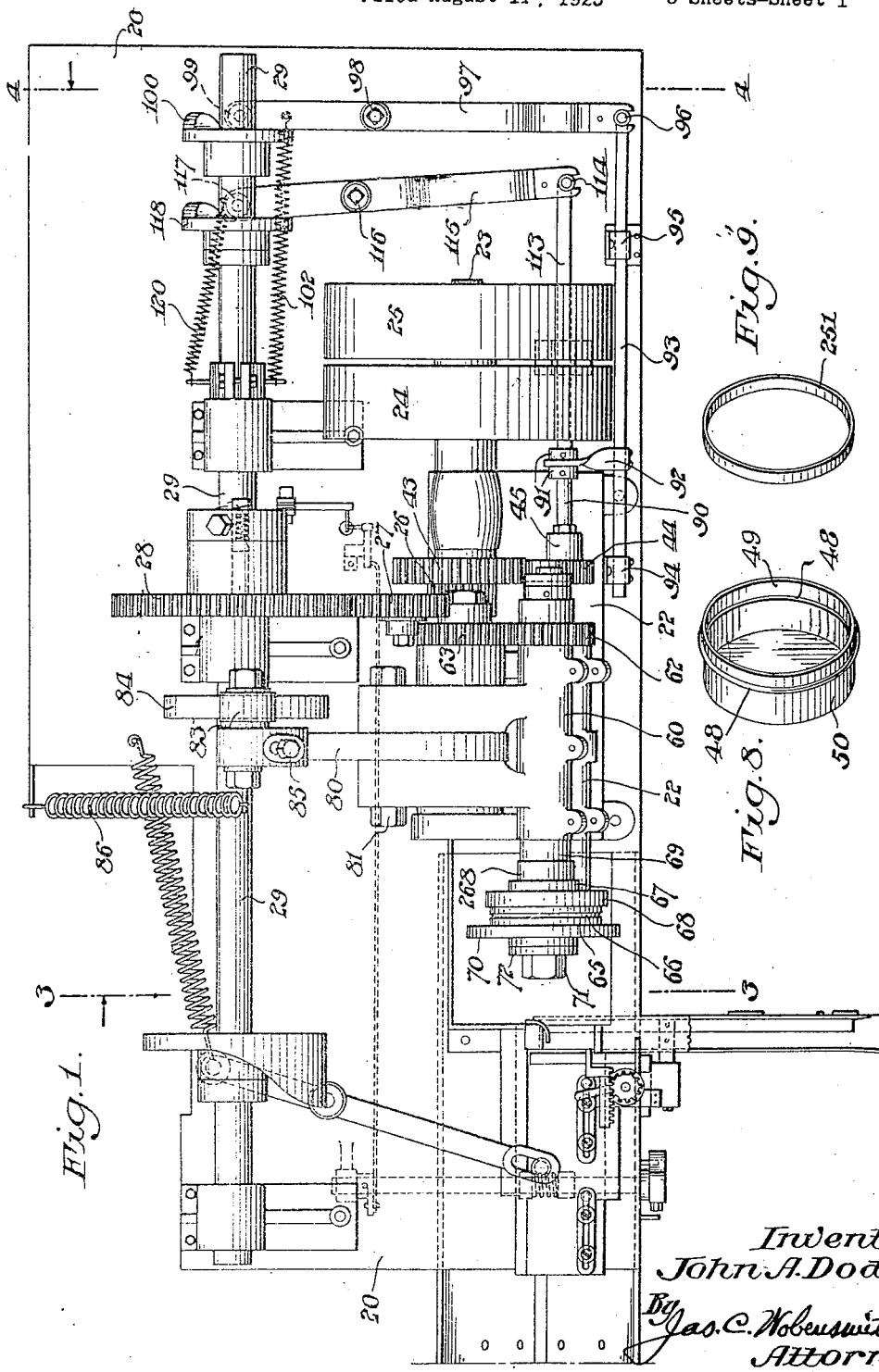
Inventor:  
John A. Dodd,  
By Jas. C. Wobensmith  
Attorney.

Nov. 9, 1926. 1,605,924
J. A. DODD
MACHINE FOR TRIMMING METAL SHELLS
Filed August 11, 1925 3 Sheets-Sheet 2
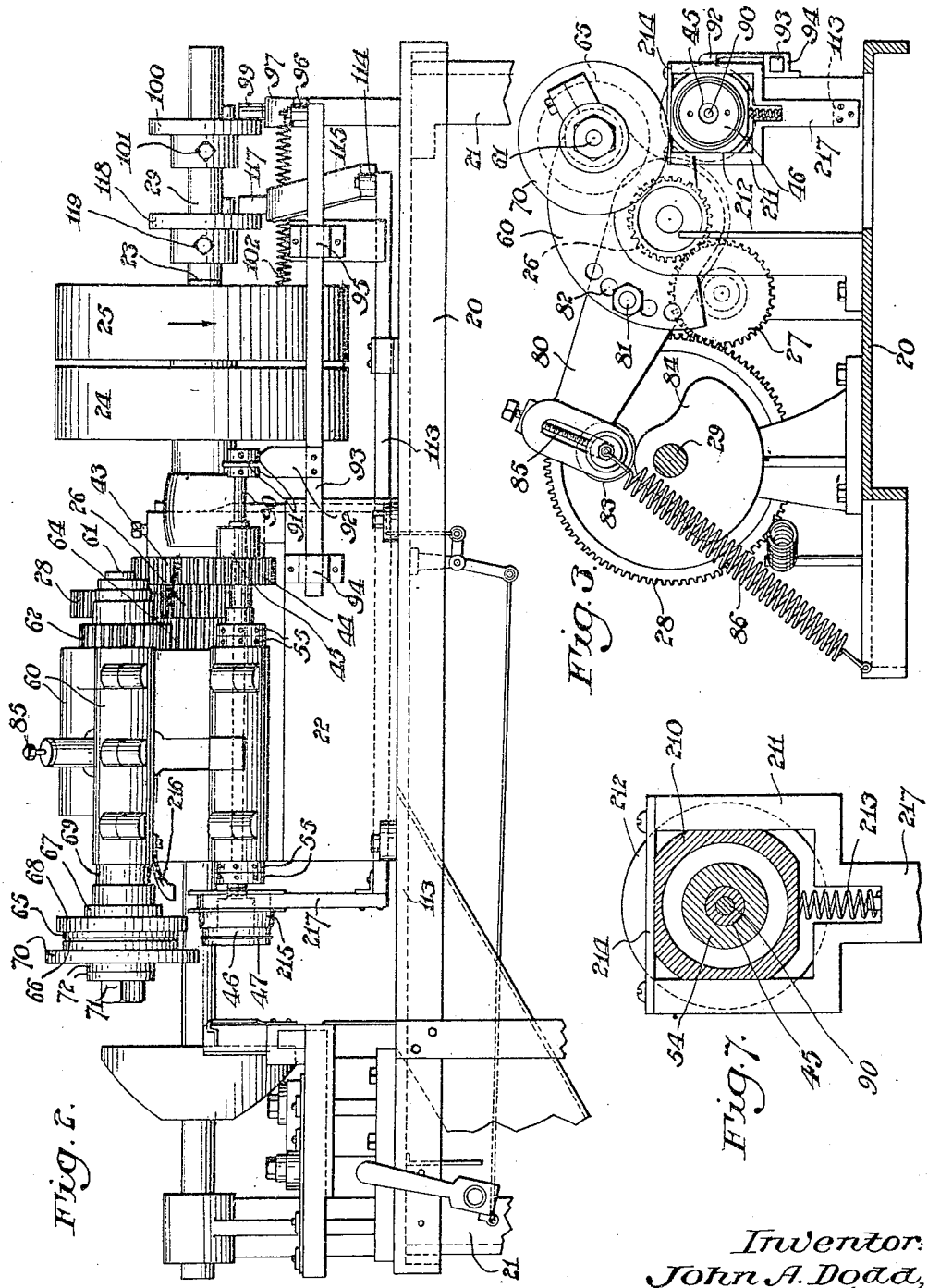
Inventor:
John A. Dodd,
By Jas. C. Nobuswith
Attorney.

Nov. 9, 1926.
J. A. DODD
1,605,924
MACHINE FOR TRIMMING METAL SHELLS
Filed August 11, 1925    3 Sheets-Sheet 3
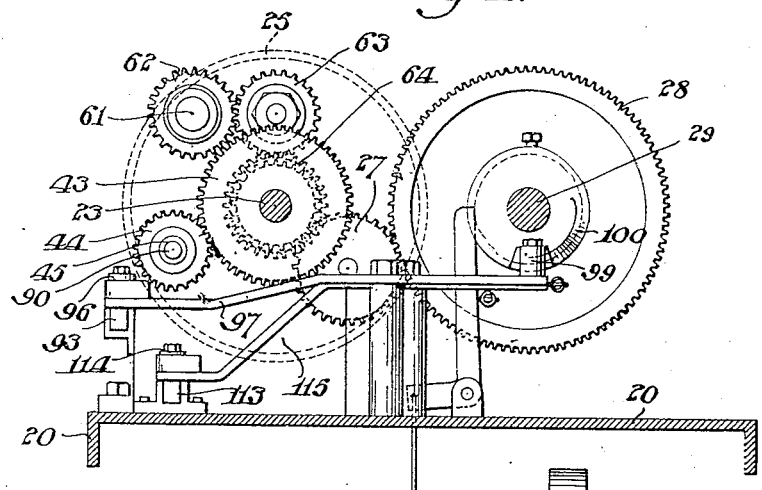
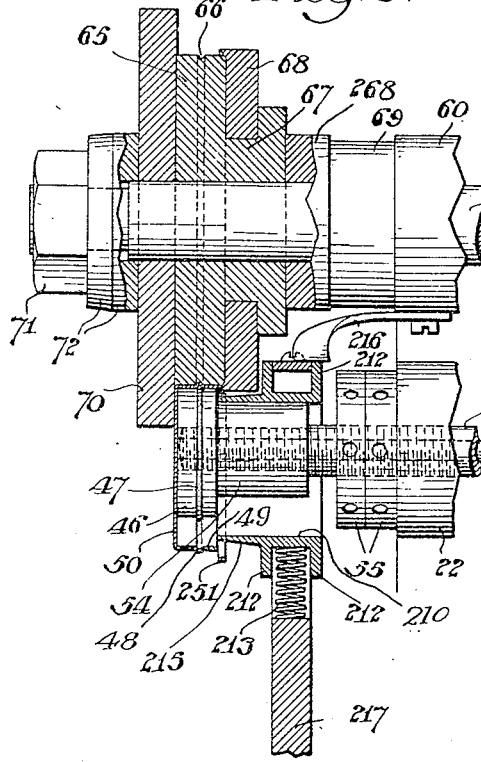
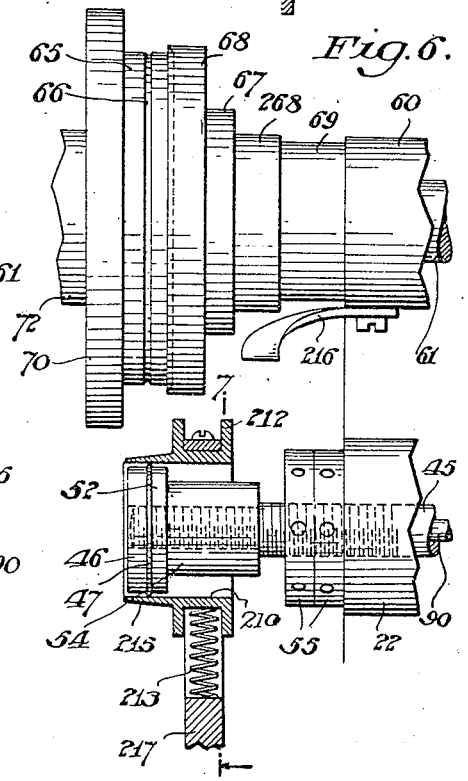
Inventor:
John A. Dodd,
By Jas. C. Wobensmith
Attorney Patented Nov. 9, 1926.

1,605,924

UNITED STATES PATENT OFFICE.

JOHN A. DODD, OF CAMDEN, NEW JERSEY.

MACHINE FOR TRIMMING METAL SHELLS.

Application filed August 11, 1925. Serial No. 49,662.

My invention relates to a machine for forming and trimming metal shells, that is to say, for working, in the side walls of metal shells used for salve boxes, bottle and jar caps and the like, beads, threads, knurling and the like, and for simultaneously trimming said shells, the same relating more specifically to that type of machine in which the beads, threads, knurling and the like are formed in the side walls of the shells by a rolling operation.

In my previous application for Letters Patent, filed May 5, 1924, Serial No. 711,117, there is shown and described a machine for beading, threading or knurling the side walls of cylindrical metal shells, and for simultaneously trimming the same. In said machine, there is provided an improved form of forming rolls, improved means for feeding the metal shells to the forming rolls, improved means for removing the formed shells, as well as the scrap trimmed therefrom, from the forming rolls, and improved means for separating the shells from the scrap.

My present invention relates to certain improvements in said machine, particularly with reference to such portions thereof as are provided for removing the scrap from the forming and trimming rolls, whereby the efficiency of the machine will be greatly increased.

The object, therefore, of my present invention is to provide, in a machine of the character aforesaid, improved mechanism for removing the scrap from the forming and trimming rolls, which is so constructed and arranged as to positively insure the removal of said scrap, thereby eliminating fouling of the same in the rolls, and thus reducing the stoppages which are required for clearing the rolls, and also permitting increased speed of operation of the machine, thereby increasing the output thereof.

The nature and characteristic features of my invention will be more readily understood from the following description, taken in connection with the accompanying drawings forming part hereof, in which:

Figure 1 is a top or plan view of a machine embodying the main features of my present invention;

Fig. 2 is a front elevation thereof, the supply chute being removed and other parts broken away for the purpose of more clearly illustrating certain other parts of the machine;

Fig. 3 is a transverse section of the machine, taken approximately on the line 3—3 of Fig. 1;

Fig. 4 is a transverse section, taken approximately on the line 4—4 of Fig. 1, certain parts being omitted to illustrate certain details of the mechanism more clearly;

Fig. 5 is an enlarged sectional detail view illustrating the arrangement of the forming and trimming rolls and the associated parts, the same being shown in the operative condition;

Fig. 6 is a similar view, the forming and trimming rolls, however, being shown in the separated positions;

Fig. 7 is a vertical section of a portion of the mechanism for removing the scrap, the view being taken approximately on the line 7—7 of Fig. 6;

Fig. 8 is a perspective view of a finished shell, illustrating one form of the same which is adapted to be made upon the machine arranged as shown in the drawings; and Fig. 9 is a similar perspective view of a typical piece of scrap which is trimmed from the shell.

Referring to the drawings, in the particular embodiment of my invention therein shown, 20 is the bed plate upon which the various parts of the machine are mounted, this bed plate being supported by suitable leg members 21. Upon the bed plate 20 there is also mounted an auxiliary bed or framework 22, upon which certain of the parts are mounted. A power shaft 23 is journalled in suitable bearings provided in the auxiliary bed or framework 22. Upon the power shaft 23 are mounted fast and loose pulleys, 24 and 25 respectively. A pinion 26, mounted on and secured to the power shaft 23, meshes with and drives an idler gear 27, which in turn meshes with and drives a gear 28, which is mounted on a cam shaft 29.

Suitable manually controlled clutch mechanism may be employed for the purpose of starting and stopping the cam shaft 29 of the machine as desired, but as the particular construction and arrangement of the same form no essential part of the present invention, detailed description of the same is omitted herein, reference being had for such purpose to my previous application for Letters Patent Serial No. 711,117, wherein suitable mechanism is shown and described.

A gear 43 is also mounted upon and secured to the power shaft 23, this gear 43 meshing with and driving a pinion 44, which is mounted on and secured to a hollow spindle 45, which extends through and is journalled in a portion of the auxiliary bed or framework 22. Upon the front end of the hollow spindle 45 the lower or internal forming roll 46 is fixedly secured, this internal forming roll, in the form shown, being provided with a rib 47 for forming the bead 48 in the side wall 49 of the metal box shell 50. Adjacent the forming roll 46 there is mounted an annular cutter 52. A sleeve 54 is threaded on the hollow spindle 45, and serves to clamp the cutter member 52 to the forming roll 46. The hollow spindle 45 is externally threaded adjacent each end of the framework 22 in which the same is journalled, and upon this threaded portion there are mounted adjusting nuts 55 to enable the hollow spindle 45 to be longitudinally adjusted in its journals.

A rocking frame 60 is journalled in the bed or framework 22, with its axis of oscillation preferably coincident with the axis of the power shaft 23, and in this rocking frame 60 a spindle 61 is journalled. Mounted on and secured to the spindle 61 is a gear 62, which meshes with and is driven by an idler gear 63, which in turn meshes with and is driven by a gear 64, which is mounted on and secured to the power shaft 23. Upon the front end of the spindle 61 is the upper or external forming roll 65, which is provided with an annular groove 66, complemental to the rib 47 on the lower or internal forming roll 46, for the purpose of rolling the bead in the side walls 49 of the metal box shells 50. Adjacent the external forming roll 65 there is mounted, on the spindle 61, a flanged collar 67, upon which an annular cutter 68 is mounted. The cutting edge of the cutter 68 coacts with the cutting edge of the cutter 52 which is mounted adjacent the lower forming roll 46. The cutter 68 is held adjacent the upper forming roll 65 by means of a sleeve 268, which abuts against an enlarged shouldered portion 69 of the spindle 61, which enlarged portion takes the thrust against the end of the bearing in the rocking frame 60 in which the spindle 61 is journalled.

Adjacent the outer face of the upper forming roll 65, there is mounted a flange disc 70, projecting beyond the forming roll 65 and adapted to retain the metal box shell in proper position with respect to the forming rolls during the forming operation. The outer end of the spindle 61 is threaded for the mounting thereon of a retaining nut 71, which serves to secure the various parts of the upper forming roll and cutter to each other, and on the spindle 61. Washers 72 may, when required, be interposed between the clamping nut 71 and the outer face of the flange disc 70 adjacent the upper forming roll 65, so as to permit forming rolls of various shapes and sizes to be alternatively mounted on the spindle 61.

The rearward portion of the rocking frame 60 is bifurcated for the mounting of a lever arm 80, which is adjustably secured thereto by means of a bolt 81 and the provision of a plurality of apertures 82 in the rocking frame 60, in one of which said bolt 81 is adapted to be selectively placed for the purpose of effecting the adjustment. The outer end of the lever arm 81 carries a roller 83, which rests on a cam 84 which is mounted on and secured to the cam shaft 29. The roller 83 is adjustable in the end of the lever arm 80 by means of a bolt 85, this bolt 85 serving as a means of fine adjustment, while the coarse adjustment is provided by means of the bolt 81 and apertures 82, hereinbefore mentioned. The roller 83 is held against the cam 84 by means of a coil spring 86, which serves to elevate and hold the upper forming roll 65 away from the lower forming roll 46 at a certain period during each revolution of the cam shaft 29.

An ejector rod 90 is mounted within the hollow spindle 45, extending therethrough and projecting out at the rear thereof, and upon the rear end of the ejector rod 90 there are mounted collars 91, between which extends the bifurcated end of an arm 92 which is secured to a slidable rod 93. The slidable rod 93 is guided in suitable brackets 94 and 95, secured to stationary portions of the structure. One end of the slidable rod 93 is provided with a pin 96, which is engaged by the forked end of a lever 97, which lever 97 is pivoted as at 98, and is provided at its other end with a roller 99, which bears against the face of a cam 100. The cam 100 is adjustably secured to the cam shaft 29 by means of a set screw 101. A spring 102 serves to maintain the roller 99 against the face of the cam 100, thereby normally retracting the ejector rod 90 to its rearmost position, through the intervening mechanism above described.

For the purpose of removing the scrap ring which is cut from the finished shell, there is provided the mechanism constituting the principal novel part of the present invention. The same comprises a sleeve 210, which surrounds the sleeve 54 which is mounted on the hollow spindle 45 behind the cutter 52. The sleeve 210 is mounted in a yoke 211 in such manner as to be capable of vertical movement with respect thereto. The sleeve 210 is guided in the yoke 211 by means of the flanges 212. A spring 213 serves to hold the sleeve 210 normally in its uppermost position, the sleeve being limited in its upward movement by the plate 214 which extends across the top of the yoke 211. The sleeve 210 is provided with a tapered extension 215.

The rocking frame 60, in which the spindle 61 of the upper forming roll 65 is journalled, has secured thereto an extending arm 216, the outer end of which is adapted, when the upper forming roll 65 is depressed, to engage the upward extension of one of the flanges 212 of the sleeve 210, serving to depress the same when the upper forming roll is lowered during the forming and cutting operation, as will be hereinafter more fully explained. The yoke 211, in which the sleeve 210 is mounted, is formed at the upper end of a bracket arm 217, the lower end of the bracket arm 217 being secured to one end of a horizontal slidable rod 113. The other end of the slidable rod 113 is provided with a pin 114, which is engaged by the forked end of a lever 115, which lever 115 is pivoted as at 116 and carries a roller 117. The roller 117 bears against the face of a cam 118, which is mounted on the cam shaft 29 and secured thereto by means of a screw 119. A spring 120 serves to maintain the roller 117 against the face of the cam 118, thereby retracting the collar 210 to its rearmost position, through the intervening mechanism above described.

The means for supplying and feeding the metal shells to the forming rolls, and for initially positioning the same with respect thereto, forms no part of the present invention. Mechanism suitable for such purpose is shown and described in my previous application for Letters Patent, Serial No. 711,117, herein—

The operation of the machine, as above described, may now be explained. The main shaft 23 being rotated by means of the driving pulley 24, the lower hollow spindle 45 will be rotated by means of the gears 43 and 44, and consequently the lower forming roll 46, which is mounted at the front end of the spindle 45, will be continuously rotated. At the same time, the upper spindle 61 will also be continuously rotated by means of the gears 64, 63, and 62, the gear ratios being such that the upper forming roll 65 will be rotated with substantially the same peripheral speed as that of the lower forming roll 46. The motion of the power shaft 23 will also be transmitted by means of gears 26, 27 and 28 to the cam shaft 29.

One of the metal shells 50 having initially been deposited over the lower forming roll 46, and the cam shaft 29 continuing to rotate, the cam 84 will, through the intermediary of the roller 83 and lever arm 80, cause the rocking frame 60 to be actuated, thereby causing the upper spindle 61, and consequently the upper forming roll 65 and the parts associated therewith, to be lowered to coact with the lower forming roll 46 and the parts associated therewith. The flange member 70 will then engage the outer face of the metal shell 50, which has previously been deposited on the lower forming roll 46, and thereby properly maintain the position of said metal shell between the forming rolls.

As the forming rolls are thus brought into juxtaposition, and as said forming rolls continue to rotate, the rib 47 of the lower forming roll 46, coacting with the annular groove 66 in the upper forming roll, will form the bead 48 in the side wall of the metal shell. Simultaneously with this action, the cutter 52, which is associated with the lower forming roll 46, and the cutter 68, which is associated with the upper forming roll 65, will coact at their cutting edges to sever the ring of scrap 251 from the metal shell, thus insuring the trimming of the edge of the shell a uniform distance from the bead which is formed in the side wall thereof.

After the bead 48 has been formed in the side wall 49 of the metal shell 50, by the forming rolls 46 and 65, the cam shaft 29 continuing to rotate, and the cam 84 being so shaped as to permit the rocking frame 60 to be actuated, the upper spindle 61 and the parts carried thereby will now be raised, this action being accomplished by means of the coil spring 86 which extends between the end of the lever 80 and the bed plate 20. After the upper spindle has been thus raised to cause the upper forming roll 65 to be moved away from the metal shell which is mounted on the lower forming roll, and to cause the flange member 70, which is associated with the upper forming roll 65, to be freed of engagement with the outer face of the shell 50, the cam 100 will then cause the lever 97 to be actuated, thereby longitudinally shifting the slide rod 93 and the forked member 92 carried thereby. As hereinbefore described, the forked member 92 engages the collars 91 on the rear end of the ejector rod 90 which passes through the lower hollow spindle 45. The ejector rod 90 will thus be moved forward, and the front end thereof will encounter the wall of the metal shell and cause the same to be knocked off the lower forming roll 46.

It should be noted, however, that when the rocking frame 60 is in the depressed position, while the forming and cutting rolls are functioning to form the bead in the shell and simultaneously to trim the same, the arm 216, which is carried by the rocking frame 60, will depress the sleeve 210 in the yoke 211 in which the same is mounted. In this manner, the projecting portion 215 of the sleeve 210 will be forced downward to clear the upper cutter 68, while at the same time being positioned to receive the scrap ring 251 which is trimmed from the shell. When the rocking frame 60 is subsequently elevated, the arm 216 will be moved to a position to permit the sleeve 210 to be raised by the spring 213, whereupon the projecting portion 215 of the sleeve 210 will positively raise the scrap ring 251 above the lower cutter 52, to prevent the same from fouling with respect thereto. Closely following the action of the ejecting mechanism hereinbefore described, the cam 118 will cause the lever 115 to be actuated, thereby imparting a forward movement to the slide rod 113, upon the forward end of which the bracket arm 217 is secured. In this manner, the sleeve 210, which is carried in the yoke 211 at the top of the bracket arm 217, will be moved forward over the cutter 52 and lower forming roll 46.

After the sleeve member 210 is thus moved forward, the ring of scrap 251, which, as hereinbefore described, has been trimmed from the metal shell and positioned over the tapered forward end of the sleeve 210, will be carried forward until the front end of the tapered extension 215 of the sleeve 210 will pass beyond the forming roll 46. The forward movement of the sleeve 210 being arrested, the momentum will carry the ring of scrap 251 further forward and cause the same to be freed from the extension 215 of the sleeve 210, whereupon said ring of scrap will fall downward and be discharged from the operative parts of the machine. The sleeve 210 will thereafter be retracted to the location initially described, to be there positioned during the trimming of the next succeeding shell.

It will be seen that, in the machine herein described, there is provided improved mechanism for positively insuring the removal of the ring of scrap which is trimmed from the metal shell, which is so constructed and arranged as to preclude the possibility of the scrap fouling in the rolls and cutters, whereby the stoppages for the purpose of clearing the rolls will be greatly reduced, and the output of the machine will be greatly increased.

Having thus described the nature and characteristic features of my present invention, what I claim as new and desire to secure by Letters Patent, is:

1. In a machine of the character described, a rotatable internal cutter disc over which a metal shell is adapted to be positioned for the purpose of trimming the same, a rotatable external cutter disc adapted to coact with said internal cutter disc when said cutter discs are brought together to effect the trimming operation, means for bringing said cutter discs together and for thereafter separating the same, spindles upon which said cutter discs are mounted, a sleeve surrounding the spindle upon which the internal cutter disc is mounted, said sleeve having a portion adapted to receive the scrap trimmed from the shell by the cutter discs, means for moving said sleeve forward to carry the scrap over the internal cutter disc when the cutter discs are separated and means for depressing said sleeve when said cutter discs are brought together.

2. In a machine of the character described, a rotatable internal cutter disc over which a metal shell is adapted to be positioned for the purpose of trimming the same, a rotatable external cutter disc adapted to coact with said internal cutter disc when said cutter discs are brought together to effect the trimming operation, means for bringing said cutter discs together and for thereafter separating the same, spindles upon which said cutter discs are mounted, a sleeve surrounding the spindle upon which the internal cutter disc is mounted, said sleeve having a portion adapted to receive the scrap trimmed from the shell by the cutter discs, said sleeve being adapted to be moved forward to carry the scrap over the internal cutter disc, means for moving said sleeve forward, means for supporting said sleeve whereby the same may be depressed to clear the external cutter disc when said cutter discs are brought together, and means adapted to engage and depress said sleeve when the cutter discs are brought together.

3. In a machine of the character described, a rotatable internal cutter disc over which a metal shell is adapted to be positioned for the purpose of trimming the same, a rotatable external cutter disc adapted to coact with said internal cutter disc when said cutter discs are brought together to effect the trimming operation, means for bringing said cutter discs together and for thereafter separating the same, spindles upon which said cutter discs are mounted, a sleeve surrounding the spindle upon which the internal cutter disc is mounted, said sleeve having a portion adapted to receive the scrap trimmed from the shell by the cutter discs, said sleeve being adapted to be moved forward to carry the scrap over the internal cutter disc, a cam and intervening mechanism for moving said sleeve forward, means for supporting said sleeve whereby the same may be depressed to clear the external cutter disc when said cutter discs are brought together, and means adapted to engage and depress said sleeve when the cutter discs are brought together.

4. In a machine of the character described, a rotatable internal cutter disc over which a metal shell is adapted to be positioned for the purpose of trimming the same, a rotatable external cutter disc adapted to coact with said internal cutter disc when said cutter discs are brought together to effect the trimming operation, means for bringing said cutter discs together and for thereafter separating the same, spindles upon which said cutter discs are mounted, a sleeve surrounding the spindle upon which the internal cutter disc is mounted, said sleeve having a portion adapted to receive the scrap trimmed from the shell by the cutter discs, said sleeve being adapted to be moved forward to carry the scrap over the internal cutter disc, means for moving said sleeve forward, means for supporting said sleeve whereby the same may be depressed to clear the external cutter disc when said cutter discs are brought together, a member in which the spindle for the external cutter disc is journaled, and an arm carried by said member adapted to engage and depress said sleeve when the cutter discs are brought together.

5. In a machine of the character described, a rotatable internal cutter disc over which a metal shell is adapted to be positioned for the purpose of trimming the same, a rotatable external cutter disc adapted to coact with said internal cutter disc when said cutter discs are brought together to effect the trimming operation, means for bringing said cutter discs together and for thereafter separating the same, spindles upon which said cutter discs are mounted, a sleeve surrounding the spindle upon which the internal cutter disc is mounted, said sleeve having a portion adapted to receive the scrap trimmed from the shell by the cutter discs, said sleeve being adapted to be moved forward to carry the scrap over the internal cutter disc, a cam and intervening mechanism for moving said sleeve forward, means for supporting said sleeve whereby the same may be depressed to clear the external cutter disc when said cutter discs are brought together, a member in which the spindle for the external cutter disc is journaled, and an arm carried by said member adapted to engage and depress said sleeve when the cutter discs are brought together.

6. In a machine of the character described, a rotatable internal cutter disc over which a metal shell is adapted to be positioned for the purpose of trimming the same, a rotatable external cutter disc adapted to coact with said internal cutter disc when said cutter discs are brought together to effect the trimming operation, means for bringing said cutter discs together and for thereafter separating the same, a sleeve surrounding the axis of the internal cutter disc, said sleeve having a portion adapted to receive the scrap trimmed from the shell by the cutter discs, means for moving said sleeve forward to carry the scrap over the internal cutter disc when the cutter discs are separated, and means operative when said cutter discs are brought together for shifting said sleeve out of the path of the external cutter disc.

7. In a machine of the character described, a pair of rotatable cutter discs over one of which a metal shell is adapted to be positioned for the purpose of trimming the same, means for bringing said cutter discs together to effect the trimming operation and for thereafter separating the same, a sleeve associated with one of said cutter discs and surrounding the axis thereof, said sleeve having a portion adapted to receive the scrap trimmed from the shell by the cutter discs, means for moving said sleeve forward when the cutter discs are separated to carry the scrap over the cutter disc with which said sleeve is associated, and means operative when said cutter discs are brought together for shifting said sleeve transverse to its axis.

8. In a machine of the character described, a rotatable internal cutter disc over which a metal shell is adapted to be positioned for the purpose of trimming the same, a rotatable external cutter disc adapted to coact with said internal cutter disc when said cutter discs are brought together to effect the trimming operation, means for bringing said cutter discs together and for thereafter separating the same, a sleeve surrounding the axis of the internal cutter disc, said sleeve having a portion adapted to receive the scrap trimmed from the shell by the cutter discs, means for moving said sleeve forward to carry the scrap over the internal cutter disc when the cutter discs are separated, and means for depressing said sleeve when said cutter discs are brought together.

In testimony whereof, I have hereunto signed my name.

JOHN A. DODD.